United States Patent [19]

Bloom et al.

[11] 4,241,355
[45] Dec. 23, 1980

[54] ABLATIVE OPTICAL RECORDING MEDIUM

[75] Inventors: Allen Bloom, East Windsor; William J. Burke, Princeton Junction, both of N.J.

[73] Assignee: RCA Corporation, New York, N.Y.

[21] Appl. No.: 837,853

[22] Filed: Sep. 29, 1977

[51] Int. Cl.³ .............................................. G01D 15/34
[52] U.S. Cl. .................................................. 346/135.1
[58] Field of Search .............................. 346/76 L, 135

[56] References Cited

U.S. PATENT DOCUMENTS

| 3,971,874 | 7/1976 | Ohta et al. | 346/76 L X |
| 4,023,185 | 5/1977 | Bloom et al. | 346/76 L X |
| 4,037,075 | 7/1977 | Pugsley et al. | 346/76 L X |

Primary Examiner—George H. Miller, Jr.
Attorney, Agent, or Firm—H. Christoffersen; Birgit E. Morris; William J. Burke

[57] ABSTRACT

An ablative recording medium comprises a substrate coated with a light reflecting coating which in turn is coated with a light absorptive layer selected from the group consisting of lead phthalocyanine, chloroaluminum phthalocyanine, vanadyl phthalocyanine, stannic phthalocyanine and chloroaluminum chlorophthalocyanine. During recording, portions of the dye layer are ablated or vaporized by an intensity modulated focussed light beam, thereby exposing portions of the reflective layer and recording video information as a reflective-antireflective pattern.

9 Claims, 3 Drawing Figures

ABLATIVE OPTICAL RECORDING MEDIUM

This invention relates to a novel optical recording medium. More particularly, this invention relates to an optical recording medium for use with a solid state injection laser.

BACKGROUND OF THE INVENTION

Spong, U.S. Pat. No. 4,097,895 issued June 27, 1978, has described an ablative recording medium which comprises a light reflecting material, such as aluminum or gold, coated with a light absorbing layer, such as fluorescein. A focussed intensity modulated laser beam, as from an argon or helium-cadmium laser, when directed at the recording medium, vaporizes or ablates the light absorptive material, leaving a hole and exposing the light reflecting layer. The thickness of the light absorptive layer is chosen so that the structure has minimum reflectivity. After recording then, there will be maximum contrast between the minimum reflectance of the light absorbing layer and the reflectance of the light reflecting layer. Further, when the light reflective material is itself a thin layer on a non-conductive substrate, since little energy is lost through reflection from the thin absorbing layer, and little energy is lost by transmission through the reflecting layer, the energy absorbed from the light beam is concentrated into a very thin film and recording sensitivity is surprisingly high.

This system operates very well, but has the disadvantage that the argon and helium-cadmium lasers are bulky devices that require a comparatively large amount of electrical input power to operate them. In addition, an external light modulator is required. It would be desirable to operate at lower electrical input power levels such as those required by solid state injection lasers, including the aluminum gallium arsenide laser. These lasers operate between about 750 and 850 nanometers (nm) and thus materials which absorb at these wavelengths would be required for recording media useful in the above recording system.

In order to be useful as a light absorbing layer, materials must be able to be applied to form a thin, smooth layer of optical quality and a predetermined thickness; they must be absorptive at the frequency of the optical source employed; and they must ablate or melt to form smooth holes to give a signal pattern having a signal to noise ratio of at least about 40 decibels (dB).

SUMMARY OF THE INVENTION

We have found an ablative recording medium which comprises a light reflecting layer and a light absorbing layer which absorbs at about 750–850 nm comprising a dye having the formula

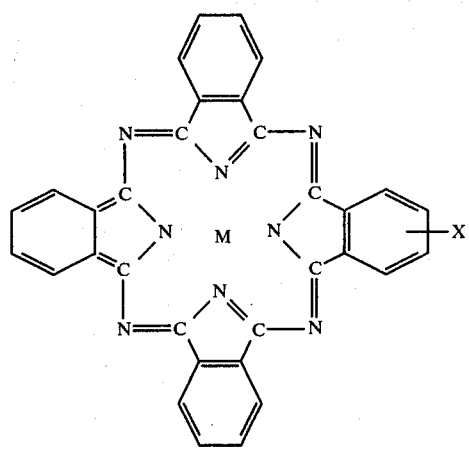

wherein X is hydrogen or chlorine and M is selected from the group consisting of lead, aluminum, vanadyl, or tin (+4).

DETAILED DESCRIPTION OF THE INVENTION

The dyes particularly suitable for use in the present recording medium include lead phthalocyanine, chloroaluminum phthalocyanine, vanadyl phthalocyanine, stannic phthalocyanine or chloroaluminum chlorophthalocyanine.

The above compounds all absorb at the solid state injection laser wavelengths and all can be evaporated onto a light reflecting layer to give smooth, optical quality light absorption layers that form recorded information having high signal to noise ratios.

Vanadyl phthalocyanine has an index of refraction of 2.4 and an absorption coefficient, K, of 1.0 at 800 nm.

Chloroaluminum phthalocyanine has an index of refraction of 3.2 and an absorption coefficient of 0.5 at 800 nm.

Lead phthalocyanine has an index of refraction of 2.4 and an absorption coefficient of 0.4 at 800 nm.

Chloroaluminum chlorophthalocyanine has an index of refraction of 3.1 and an absorption coefficient of 0.3 at 800 nm.

When the light reflecting layer is itself a layer on a substrate, the nature of the substrate is not critical. This substrate should have an optically smooth, flat surface to which a subsequently applied light reflecting layer is adherent. A glass plate or disc or a plastic disc is suitable. If the light reflecting material can be formed so it is a self-sustaining layer and optically smooth, the need for a substrate may be eliminated.

The light reflecting material should reflect the light used for recording. Suitable light reflecting materials include aluminum, rhodium, gold and the like. The light reflecting material has a thickness so that it reflects the recording light.

The present phthalocyanine dyes can be applied by conventional vacuum evaporation. The dye is charged to a suitable vessel and placed in a vacuum chamber. The vessel is then connected to a source of current. A substrate is positioned above the dye. The vacuum chamber is evacuated to about $10^{-6}$ torr and current is applied to the vessel to raise the temperature of the dye to its evaporation temperature. Evaporation is continued until a dye layer of the required thickness is deposited onto the light reflecting layer, at which time the current is shut off and the chamber vented.

The invention will be further explained by reference to the drawings.

Figure 1:
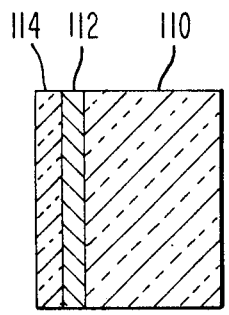
FIG. 1 is a cross sectional view of a recording medium embodying the invention prior to recording.

FIG. 1 shows a recording medium embodying the invention prior to exposure to a recording light beam comprising a glass substrate 110, a light reflecting layer 112 comprising a layer of gold about 600 angstroms thick, and a light absorbing layer 114 of one of the above mentioned phthalocyanine dyes.

Figure 2:
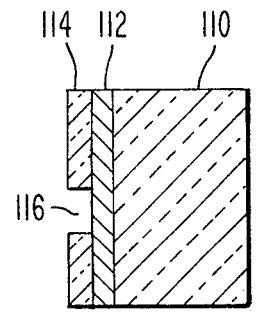
FIG. 2 is a cross sectional view of a recording medium embodying the invention after recording.

FIG. 2 shows a recording medium embodying the invention after exposure to a recording light beam wherein the dye layer 114 has been ablated to leave a hole 116, exposing the light reflecting layer 112. It will be understood that a recording medium after recording contains a plurality of holes or pits 116 rather than the single one shown in FIG. 2.

Figure 3:
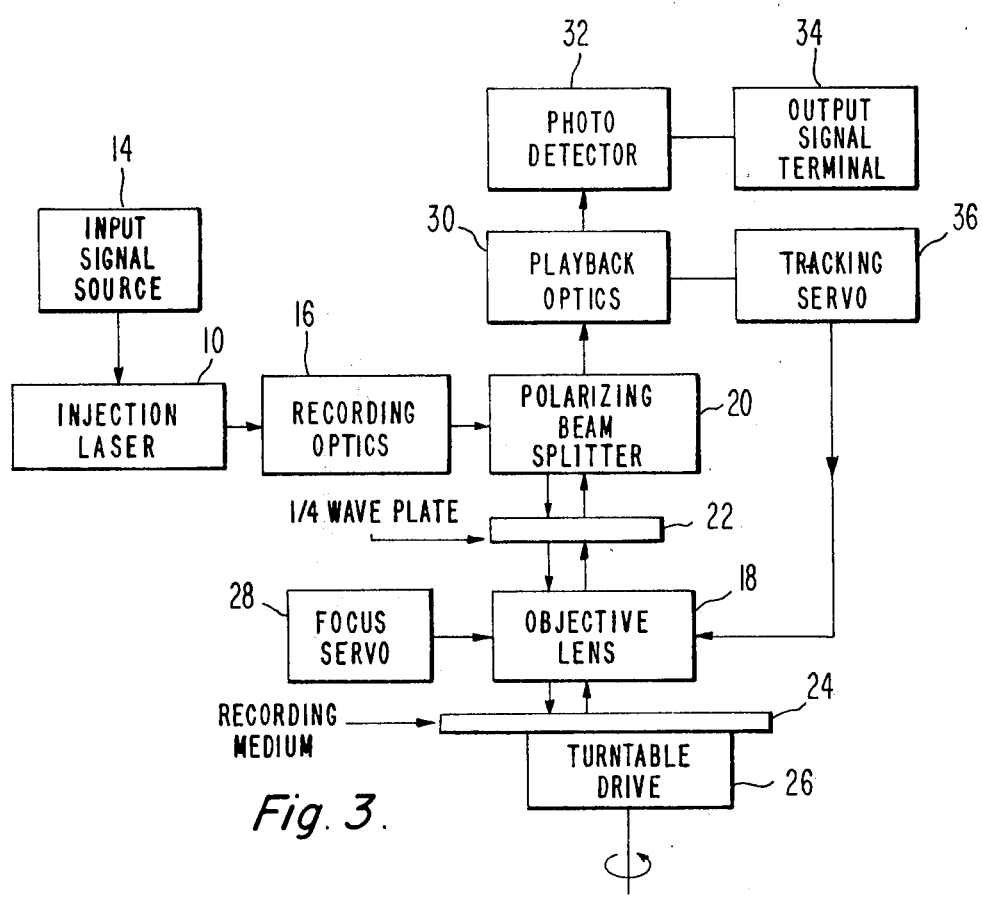
FIG. 3 is a schematic view of the system of recording and playback in which the present recording medium can be employed.

The use of the present recording medium can be explained in greater detail by referring to FIG. 3. For recording, the light emitted by an aluminum gallium arsenide injection laser 10 is modulated directly in response to an input electrical signal 14. The modulated light is enlarged by recording optics 16 to increase the diameter of the intensity modulated laser beam so that it will fill the desired aperture of an objective lens 18 in the planes parallel and perpendicular to the plane of the laser 10. The enlarged modulated laser beam is totally reflected by a polarizing beam splitter 20 and passes through a beam rotating ¼ wave plate 22 to the objective lens 18. The modulated recording beam then impinges upon a recording medium 24, as described in FIG. 1, and ablates or evaporates a portion of the light absorbing layer to expose a portion of the light reflecting layer. Recording medium 24 is rotated by the turntable drive 26 at about 1800 rpm. A focus servo 28 maintains a constant distance between the objective lens 18 and the surface of the recording medium 24.

For readout, an unmodulated and less intense laser beam, that is, one that will not cause ablation in the recording medium, follows the same path as the recording beam to the recording medium 24. The recorded reflection-antireflection pattern modulates the reflected light back through the objective lens 18 and the ¼ wave plate 22. The light, now rotated by 90° in polarization by the two passages through the ¼ wave plate 22, passes through the polarizing beam splitter 20 and is directed by playback optics 30 to a photodetector 32. The photodetector 32 converts the reflected light beam to an electrical output signal at terminal 34 which corresponds to the input signal from source 14. A tracking servo 36 monitors the light through the playback optics 30 to insure that the track in the recording medium 24 is the same during playback as that used for recording.

The invention will be further illustrated by the following Examples but the invention is not meant to be limited to the details described therein.

EXAMPLE 1

A substrate was coated by evaporating a layer of gold about 600 angstroms thick. The coated substrate was placed in a vacuum chamber above an evaporation boat containing lead phthalocyanine. A source of current was connected to the boat and the vacuum chamber evacuated to about $10^{-6}$ torr. The boat was heated to about 300°–400° C. at which the shutter was opened and the dye evaporated at a rate of about 4 angstroms per second. Evaporation was continued until a layer about 600 angstroms thick was deposited over the gold layer.

A smooth, amorphous, clear and continuous film was deposited.

The resultant recording medium was exposed to a series of 50 nanosecond light pulses having a wavelength of about 800 nm from an aluminum gallium arsenide continuous wave injection laser in an apparatus as in FIG. 3. Regularly shaped, smooth holes were ablated in the dye film down to a laser output power of about 31 milliwatts.

EXAMPLE 2

Following the general procedure of Example 1, a gold coated substrate as in Example 1 was coated with a layer of chloroaluminum phthalocyanine about 510 angstroms thick. Regularly shaped smooth holes were ablated in the dye film down to a laser output power of about 42 milliwatts.

EXAMPLE 3

Following the general procedure of Example 1, a gold coated substrate was coated with a layer of vanadyl phthalocyanine about 650 angstroms thick. The reflectivity was about 9 percent at 8000 angstroms. After standing for about six weeks, the reflectance was unchanged.

The threshold incident recording power at the recording surface required for ablating smooth, regularly shaped holes with the laser was about 3–3.5 milliwatts.

EXAMPLE 4

Following the general procedure of Example 1, a gold coated substrate was coated with a layer of chloroaluminum chlorophthalocyanine about 400 angstroms thick. The reflectance was about 13 percent at 800 nm.

The threshold incident recording power at the recording surface required for ablating smooth, regularly shaped holes was about 3–3.5 milliwatts.

COMPARATIVE EXAMPLE

Following the general procedure of Example 1, gold coated substrates were coated with other phthalocyanine dyes. However, they did not prove to be suitable for the present application. The data is summarized below in the Table.

TABLE

| Samples | Dye | Comments |
|---|---|---|
| 1 | copper phthalocyanine | weak absorption at 800 nm |
| 2 | cadmium phthalocyanine | " |
| 3 | stannous phthalocyanine | " |
| 4 | zinc phthalocyanine | " |
| 5 | nickel phthalocyanine | " |
| 6 | magnesium phthalocyanine | " |
| 7 | silver phthalocyanine | " |
| 8 | cobalt phthalocyanine | poor evaporation, weak absorption at 800 nm |
| 9 | chromium phthalocyanine | did not evaporate |

TABLE-continued

| Samples | Dye | Comments |
|---|---|---|
| 10 | phthalocyanine | did not absorb at 800 nm |
| 11 | molybdenum phthalocyanine | formed a grainy film, weak absorption at 800 nm |
| 12 | iron phthalocyanine | weak absorption at 800 nm |
| 13 | copper polychlorophthalocyanine | did not evaporate at 400° C. |
| 14 | copper hexadecylchlorophthalocyanine | decomposed on heating |
| 15 | polychlorophthalocyanine | decomposed on heating, film weakly absorbing at 800 nm |
| 16 | manganese phthalocyanine | weak absorption at 800 nm |
| 17 | fluorochromium phthalocyanine | does not absorb at 800 nm |

We claim:

1. An ablative optical recording medium comprising a light reflecting material coated with a layer of a light absorbing dye having the formula

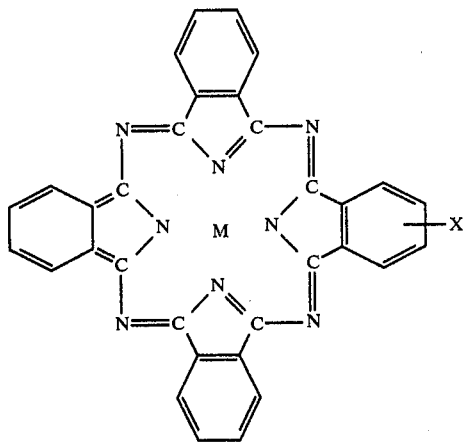

wherein X is hydrogen or chlorine and M is selected from the group consisting of lead, aluminum, vanadyl or tin (+4).

2. A recording medium according to claim 1 wherein the dye layer thickness is chosen so as to minimize the reflectivity to a light source emitting light of about 750-850 nanometers wavelength.

3. A recording medium as in claim 1 wherein portions of said light reflecting material are exposed to form a light reflecting-light absorbing pattern corresponding to video information.

4. In an ablative optical recording medium which comprises a light reflecting material coated with a light absorbing material, the improvement which comprises employing as the light absorbing material a dye selected from the group consisting of lead phthalocyanine, chloroaluminum phthalocyanine, vanadyl phthalocyanine, stannic phthalocyanine and chloroaluminum chlorophthalocyanine.

5. A recording medium as in claim 4 wherein the dye is lead phthalocyanine.

6. A recording medium as in claim 4 wherein the dye is chloroaluminum phthalocyanine.

7. A recording medium as in claim 4 wherein the dye is vanadyl phthalocyanine.

8. A recording medium as in claim 4 wherein the dye is chloroaluminum chlorophthalocyanine.

9. A recording medium according to claim 4 wherein the dye material thickness is chosen so as to minimize the reflectivity to a light source emitting at about 750-850 nanometers wavelength.

* * * * *